Nov. 21, 1967  J. W. I. HEIJNIS ET AL  3,353,754
PROCESS AND APPARATUS FOR CUTTING SYNTHETIC
POLYMER SHEETS INTO CHIPS
Filed Nov. 10, 1965  2 Sheets-Sheet 1
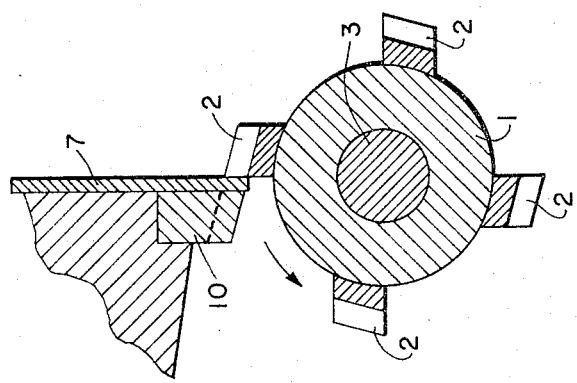
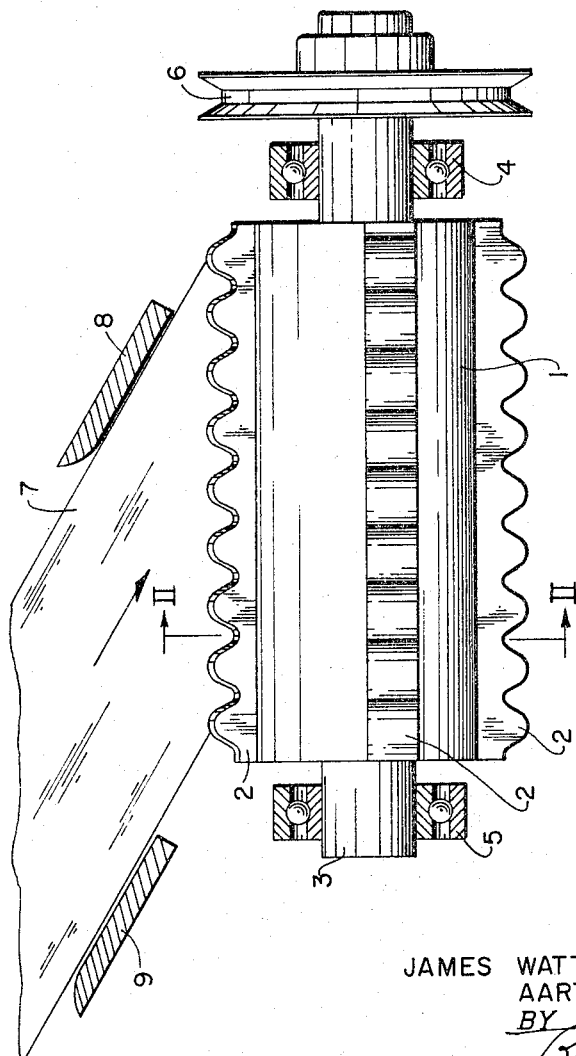
INVENTORS
JAMES WATT IJSBRAND HEIJNIS
AART CORNELIS VROLIJK
BY
AGENT

United States Patent Office 3,353,754
Patented Nov. 21, 1967

3,353,754
PROCESS AND APPARATUS FOR CUTTING SYNTHETIC POLYMER SHEETS INTO CHIPS
James W. I. Heijnis and Aart C. Vrolijk, Arnhem, Netherlands, assignors to American Enka Corporation, Enka, N.C., a corporation of Delaware
Filed Nov. 10, 1965, Ser. No. 507,091
Claims priority, application Netherlands, Nov. 25, 1964, 64—13,657
7 Claims. (Cl. 241—30)

The present invention is directed to an improved process and apparatus for manufacturing synthetic polymer chips. More particularly, the invention relates to production of clean, particulate polymer chips and to a continuous process and apparatus for cutting such chips from sheet material using stationary and rotating knife blades having cutting edges of a particular cooperative configuration.

It has been found that by forming polymerized material into particulate chips, handling and processng of synthetic materials is considerably aided. Consequently, many polymerized synthetic resins, such as polyamides and polyesters, after having been manufactured by a chemical process, are extruded, cooled, and cut into various shapes. A shape often preferred is obtained by extruding a melt through round orifices of about 1–4 mm. in diameter and cutting into chips of about 1–4 mm. in length.

Another shape sometimes used is obtained by extruding the material in the form of a strip or sheet and cutting rectangular chips off the sheet at its leading edge. In this method, the sheet is fed to two cutters or knives. Of the knives, one is stationary and the other is rotatable, with both having a serrated cooperating cutting edge. The serrated edge of the stationary knife has sharply pointed angular cutting surfaces (teeth) which intermesh with similar or identical cutting surfaces on the rotatable knife. It is often the practice to use more than one rotatable knife. When using more than one rotatable knife, the sheet is continuously fed at an acute angle to the cutting surface and teeth of the rotatable knives intermesh with indentations between teeth of the stationary knife. The knives will, on successive passes, then sever rectangular chips from the strip.

Because of the resilient nature of sheet material of this type, it has been found that granular products produced by this apparatus have certain disadvantages. Because the teeth of the cutters wear very easily, their compression of cutting gradually decreases and tends to squeeze and bend the material along the cutting edge in the direction of the cut. This squeezing and bending action forms frayed chip edges, threads or webs connecting the chips which, as a result of handling and further processing, break off and lead to the formation of excessive amounts of splinters and microscopic dust-like particles in the granular product. Loose microscopic dust and splinters interfere with chip drying and feeding in injection molding or spinning operations and make it necessary to subject the chips to several expensive and time-consuming washing steps prior to melt formation. Additionally, experiments have shown that polymer dust degrades very rapidly, even upon normal handling, and when included in the melt, the formed product thereof will be of substandard quality.

Therefore, it is an object of this invention to provide a new and improved method and apparatus for cutting from synthetic thermoplastic sheet material a small particulate product containing a minimum of strings, webs, and frayed edges.

It is still another object of this invention to provide a cutting apparatus having cutting knives which are capable of maintaining a high degree of sharpness and smoothness heretofore unattainable in prior art apparatus of similar type.

It is another object of this invention to provide a particulate, evenly cut product containing a minimum of strings, splinters, webs, and frayed edges.

It is another object of this invention to provide a particulate thermoplastic product which, in bulk form, contains a minimum amount of dust.

The manner in which these and other objects of the invention are attained will become more apparent from the following description of the invention which is intended to be illustrative rather than limitative.

It has been found that smoothly cut polymer chips can be formed from sheet material being fed at an acute angle by utilizing stationary and moving knives having a gradually curving undulating cutting edge and by maintaining the component of travel of the sheet along the face of the stationary knife, between successive cuts, less than a depth of one of its undulations and the component of displacement over the edge to about half the length of one undulation. The ratio of the height to the length ($h$ and $l$) of each undulation is maintained within the range of 0.4:1 to 0.5:1, and preferably within the range 0.44:1 to 0.45:1. The angle of the feed of the sheet to the stationary knife is maintained within the range of 25–35° and preferably 30°. As a result, chips approaching a square shape are obtained when the material is moved a distance, between successive cuts, of about 55 to 58% of the profile depth. Clean, dust-free chips will then be punched from the strip along its entire length.

Other features of novelty will be apparent from the following description and the accompanying drawings in which:

FIGURE 1 schematically shows the apparatus in plan view;

FIGURE 2 shows the details of the apparatus along lines II—II of FIGURE 1;

Figure 4:
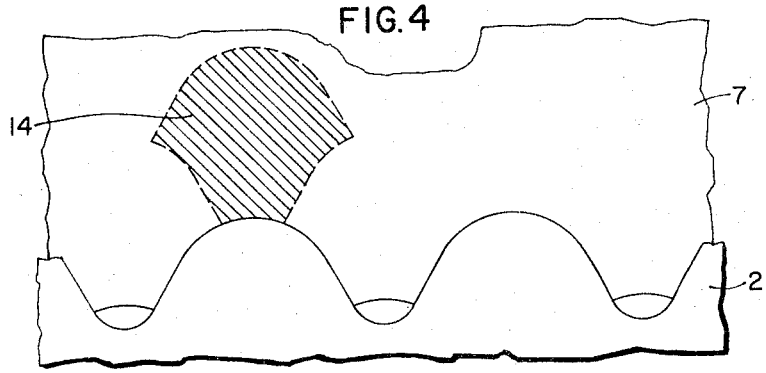
Figure 5:
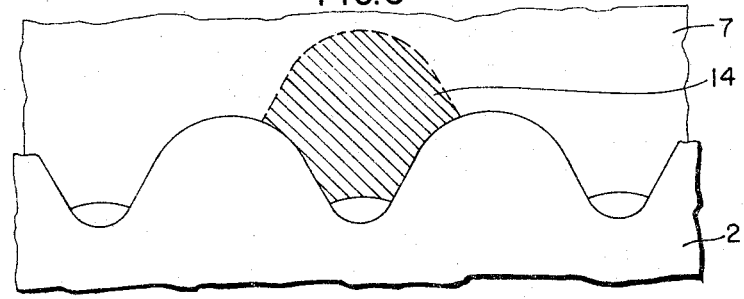
Figure 6:
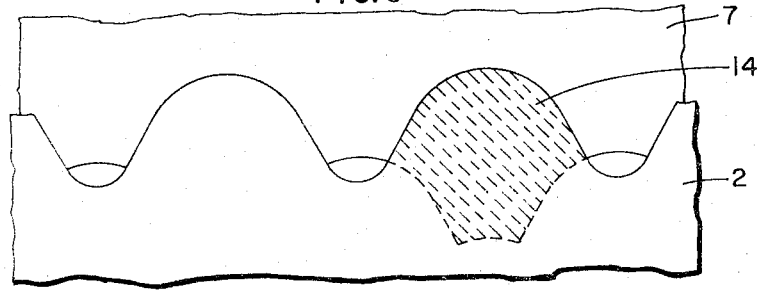

FIGURES 4, 5, and 6 are intended to illustrate the cutting process of one chip of the instant invention.

Referring more particularly to the drawings, FIGURE 1 shows rotor 1 carrying knives 2 positioned to cooperate with stationary knife 10 (shown in FIGURE 2 only). Knives 2 have a gradual undulating cutting edge and can be fixedly mounted in any convenient manner to rotor 1. Rotor 1 is mounted for rotation in bearings 4 and 5 and is driven in the direction indicated in FIGURE 2. The plastic sheet is fed to the cutter between two guides 8 and 9 in the direction indicated by the arrow. Although not shown, the sheet may be fed at a predetermined speed by any suitable means; for instatnce, by a pair of nip rollers positioned upstream of guides 8 and 9. Rotor 1 may conveniently be driven by a belt connection from a constant speed motor (not shown) through pulley 6.

FIGURE 2 shows stationary knife 10 rigidly fixed to a table in shearing engagement with one of the rotating knives 2 mounted on shaft 3. Sheet 7 is shown being fed between the stationary knife and rotating knife. Stationary knife 10 has an undulating cutting edge which intermeshes with the cutting edge of the rotating knives 2. The clearance between the knives is about 0.1 to 0.15 mm.

Figure 3:
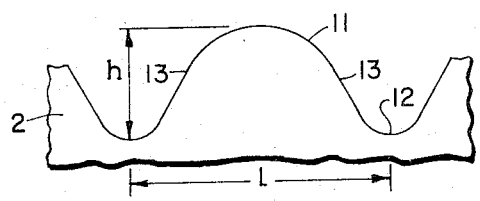
FIGURE 3 shows a knife profile on an enlarged scale.

FIGURE 3 shows a portion of one of the knife's leading edges used in the present invention. The knife 2 has a lower cutting surface 13 extending upwardly at an angle of about 60° (to the vertical) to crest 11. The symbols $h$ and $l$ refer to the depth and length of one undulation and are about 3.5 and 8 mm., respectively. The radii of curvature of cutting surface 11 and indented cutting surface 12 are about 2.5 and 1 mm., respectively. Stationary cutter 10 is serrated in like manner. The curved shape of the knives also affords a good supporting surface which contributes materially to obtaining a product having smoothly cut surfaces with a minimum of frayed edges and threads.

FIGURES 4-6 show three successive stages of forming a chip from sheet 7. The sheet is continuously fed at an angle of about 30° in respect to horizontal shaft 3 supporting cutters 2. Shaded portion 14 of the sheet 7 indicates the manner in which the strip is advanced between successive cuts and also conforms to the shape of the chip as it is finally severed from the strip. The chip is formed in three cuts, in the first cut (FIGURE 4) a small part of a chip boundary line is formed by the cutting surface 11. After a second cut (FIGURE 5), two practically straight lines are cut in the sheet by cutting surface 13 and a portion of cutting surface 11. In a third cut (FIGURE 6) chip 14 is formed and severed from the strip by cutting surfaces 11 and 13.

It has also been found that the smoothness of cut and energy required to cut the chip is also directly dependent on the temperature of the strip. It is desirable that the process of this invention be operated at an elevated temperature when cutting polymeric materials which are brittle at normal temperatures. This avoids splinters and the necessity for excessively high cutting energy. Polyethylene terephthalate sheet, for example, should be cut at around 85° C. Various other polymers such as polyamides, etc., which are usually processed at higher temperatures, should be cooled to at least a softened solid state before cutting.

What is claimed is:

1. A method of cutting a continuously supplied plastic sheet into chips comprising feeding the sheet at an acute angle to stationary and rotatable knives having undulating cutting edges and maintaining the sheet's component of travel along the face of the stationary knife, between successive cuts, less than the depth of one of the stationary knife's undulations and maintaining the sheet's component of displacement over the knife's edge to about half the length of one of its undulations.

2. A method of claim 1 in that between the two successive cuts, the sheet is moved a distance along the face of the stationary knife about 55 to 58% of the depth of one of its undulations and at an angle of about 30° to its cutting edge.

3. Apparatus for cutting a continuously supplied sheet into chips comprising:
   (1) a stationary knife
   (2) a rotatable knife adapted to cooperate with said stationary knife, and
   (3) both said knives having undulating cutting edges shaped along identical lines and wherein the ratio of the height to the length of each of the undulations is within the range of 0.4:1 and 0.5:1.

4. Apparatus of claim 3 wherein the ratio is preferably within the range of 0.44:1 to 0.45:1.

5. Apparatus of claim 3 wherein the crest of one undulation has a radius of curvature of about 2.5 times greater than that of the radius of curvature of a cutting edge comprising an indentation between undulations.

6. A smoothly cut chip produced by the method of claim 1 having a minimum of frayed edges, splinters and webs.

7. A chip product, produced by the method of claim 1 that when in bulk form, contains little or no minute dust-like particles.

References Cited

UNITED STATES PATENTS

| | | | |
|---|---|---|---|
| 3,214,106 | 10/1965 | Gorman | 241—239 X |
| 3,236,723 | 2/1966 | Whiteside | 241—191 X |
| 3,314,459 | 4/1967 | Beaubien | 241—190 X |

WILLIAM W. DYER, JR., *Primary Examiner.*

W. D. BRAY, *Assistant Examiner.*